United States Patent [19]

Thunnissen

[11] Patent Number: 4,887,937
[45] Date of Patent: Dec. 19, 1989

[54] LOAD CARRYING FLOOR

[75] Inventor: Kees W. Thunnissen, Boslaan, Netherlands

[73] Assignee: Talson Transport Engineering B.V., Heeze, Netherlands

[21] Appl. No.: 159,189

[22] Filed: Feb. 23, 1988

[30] Foreign Application Priority Data

Feb. 24, 1987 [NL] Netherlands ................ 8700453

[51] Int. Cl.⁴ .............................................. B60P 1/38
[52] U.S. Cl. .................................... 414/527; 414/529; 414/535; 198/721; 198/809; 193/35 SS
[58] Field of Search ............... 414/527, 528, 529, 530, 414/531, 532, 533, 534, 535, 536; 193/35 SS; 198/463.3, 631, 721, 750, 809

[56] References Cited

U.S. PATENT DOCUMENTS

| | | | |
|---|---|---|---|
| 2,129,796 | 4/1938 | Swift | 414/527 |
| 3,011,665 | 12/1961 | Wise | 414/535 |
| 3,104,007 | 9/1963 | Swezey et al. | 198/809 |
| 4,345,869 | 8/1982 | King | 414/528 X |
| 4,593,810 | 6/1986 | Cook | 414/535 X |
| 4,749,325 | 6/1988 | Hodgetts | 414/527 X |

FOREIGN PATENT DOCUMENTS

| | | | |
|---|---|---|---|
| 2648916 | 12/1977 | Fed. Rep. of Germany | 193/35 SS |
| 2573372 | 5/1986 | France | 414/535 |
| 0120181 | 9/1979 | Japan | 414/535 |
| 124416 | 9/1979 | Japan | 414/532 |
| 0135329 | 10/1981 | Japan | 414/530 |
| 785143 | 12/1980 | U.S.S.R. | 198/750 |
| 839900 | 6/1981 | U.S.S.R. | 198/750 |
| 2142892 | 1/1985 | United Kingdom | 193/35 SS |

Primary Examiner—Frank E. Werner
Assistant Examiner—Robert S. Katz
Attorney, Agent, or Firm—Helfgott & Karas

[57] ABSTRACT

A load carrying floor, more particularly of a load transporting vehicle, provided with a number of roller tracks disposed parallel to one another, on which a load may be displaced across the floor with low frictional resistance, displacement and holding devices being provided, comprising at least one additional track of rollers, over which a friction belt is trained, which is adapted to get into frictional contact with the lower side of a load and to be selectively driven in one direction or the other, so as to displace the load in one direction or the other and parallel to the roller tracks. The ends of the friction belt are each fastened for winding or unwinding respectively on a drum provided at the respective end of the floor.

5 Claims, 2 Drawing Sheets

LOAD CARRYING FLOOR

The invention relates to a load carrying floor, more particularly of a load transporting vehicle, provided with a number of roller tracks disposed parallel to one another, on which a load may be displaced across the floor with low frictional resistance, displacement and holding means being provided, comprising at least one additional track of rollers, over which a friction belt is trained, which is adapted to get into frictional contact with the lower side of a load and to be selectively driven in one direction or the other, so as to displace the load in one direction or the other and parallel to the roller tracks. Such a load carrying floor is disclosed in EP 0002106 and is used e.g. in load carrying vehicles which are designed for transporting containers and/or pallets. The rollers of the relatively narrow roller tracks are mounted for free rotation and have their upper portions, in the active supporting position, projecting just above floor level.

Depending of the (uniform) width of the pallets or containers the load carrying floor surface may consist of a plurality of juxtaposed sections which may each comprise e.g. two roller tracks to support the respective pallets or containers adjacent their longitudinal edges. Relatively slight horizontal forces are sufficient to displace even heavy loads across such a load carrying floor, provided with roller tracks. In certain situations, such as in case of a sloping load supporting floor, uncontrolled, danger involving displacements could even occur. For this reason special displacement and holding means, adapted to be driven, are applied to have each load displacement across the load supporting floor take place in a controlled manner.

In the well-known load carrying floor above referred to the friction belt is carried out as endless belt. It is a disadvantage of this embodiment, that the returning or lower run of the belt(s) requires a special structure of the floor and also takes additional construction height, due to which such a floor cannot be used e.g. in cargo vehicles having a relatively low floor level.

According to the invention this objection is met in that the ends of the friction belt(s) are each fastened for winding or unwinding respectively on a drum provided at the respective end of the floor. The required winding and unwinding drums take little space and may be mounted at the ends (of the concerning section) of the floor in a relatively simple manner. A friction belt, so constructed, not only consititutes an effective driving element, which—in case of slippage—will not cause serious damage to the lower surface of the load, but moreover requires little maintenance and may be simply replaced.

Due to the invention a well-known type of load supporting floor which is equipped with a number of roller tracks only, may be simply reconstructed to a load carrying floor with controlled load displacement facility by merely putting a friction belt over at least one (e.g. centrally located) roller track.

The structure according to the invention is also particularly suitable for a so called "stepped load carrying floor", which is equipped with a floor section functioning as a lifting platform, as decsribed in U.S. Ser. No. 07/033,016.

It is to be noted that EP 0081695 discloses a cargo carrying vehicle the load supporting floor of which is constituted by a belt-like means the ends of which are fastened for winding and unwinding respectively on drums provided at both ends of the floor. In this case, however, the belt covers the entire floor surface and consequently is always in its active supporting position. With such a construction it will not be possible e.g. to move the belt in the unloading direction without taking along any load which has been previously deposited in the cargo space of the vehicle.

The invention will be hereinafter further described by way of example with reference to the drawing.

Figure 1:
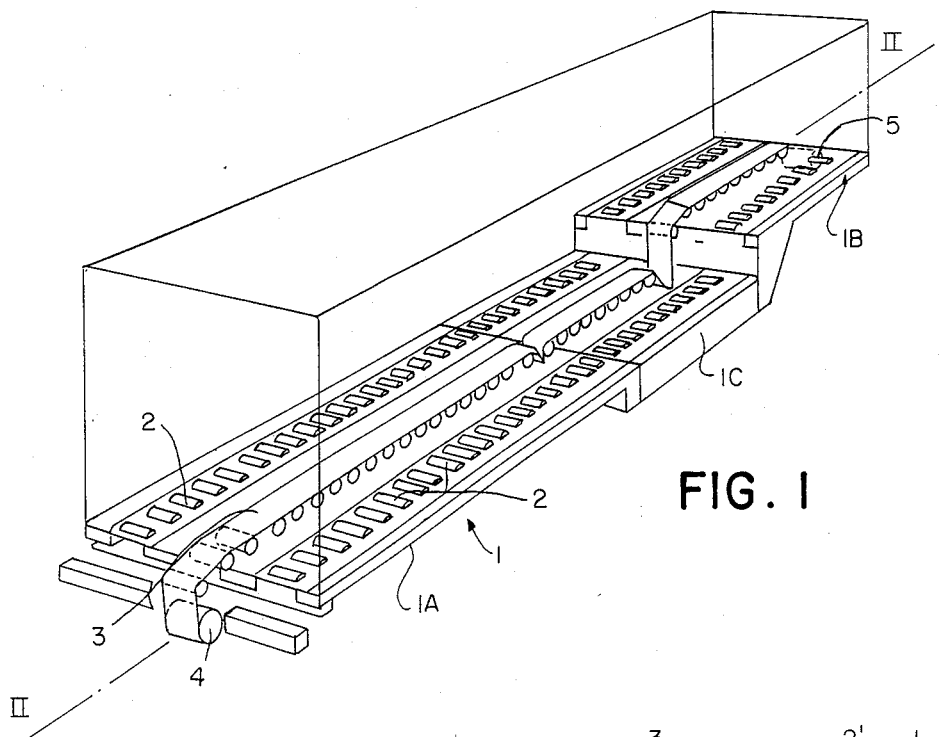
FIG. 1 is a diagrammatic perspective view of a stepped floor of a cargo transporting vehicle of the goose neck tupe.

The load carrying floor 1 shown in FIG. 1 is e.g. of the type described in U.S. Ser. No. 07/033,016, in which the intermediary section 1C may be elevated as a lifting platform, from the plane of the rear section 1A into the plane of the front section 1B. In the example shown in the drawing the floor is provided with two roller tracks 2 extending along the entire floor length, on which the loads, e.g. containers or pallets, may be easily displaced. The use of such roller tracks in load supporting floors is known. The individual rollers are mostly mounted for free rotation about their transversally oriented axes. Often the rollers are supported in groups on hollow carriers inserted into the floor. These carriers may, by supplying a pressurized fluid into the hollow interior, be extended in vertical direction to elevate the rollers from an inactive position in which they are sunk into the floor, into an active supporting position, in which they are projecting with their upper portions just beyond the floor surface. Between the two rollers tracks 2 a friction belt 3 according to the present invention is provided which extends along the entire floor length. The free ends of this friction belt are each attached for winding or unwinding respectively to a drum 4 or 5 respectively provided at the front end or rear end respectively below the load supporting floor 1. The friction belt 3 is designed to get into frictional engagement with the lower side of a load placed onto the roller tracks so as to take said load along when driving the belt in the forward or rearward direction. The friction belt 3 is movably supported with low friction on a base 6 inserted in the proper floor. In the example shown in the drawing this base is formed by a roller track of the type which has been herein before described with reference to the two roller tracks 2 (vide FIG. 3). In the foor 1 a longitudinally extending housing 15 is inserted, in which the rollers 2′ which are rotatably mounted in a frame 16, are supported with the intermediary of a carrier 17. The carrier is hollow and is formed of an elastic material, so that by supplying or discharging respectively of a pressurized fluid to (from) the hollow carrier interior an adjustment of the vertical position of the frame with rollers 16, 2′ between a lower and an upper relative position relative to the floor 1 may be effected.

Figure 3:
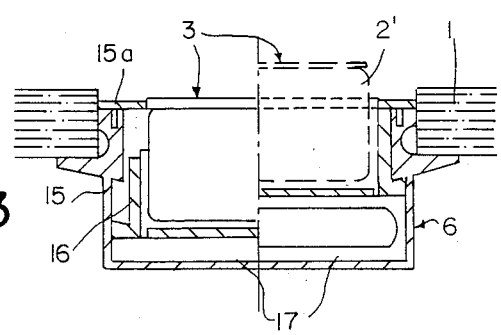
FIG. 3 is a cross-sectional view through a friction belt and its base, in which the left half is shown in the inactive or recessed position and the right half is shown in the active or lifted position

The upper position is shown in the right half of FIG. 3. In this position the carrier 17 is inflated—by supplying a suitable pressurized fluid, such as pressurized air—to its maximum height which height is reached when the frame 16 has engaged a shoulder of the housing 15. The rollers 2' project through corresponding openings in a cover plate 15a overlying the upper side of the housing 15; the frictionbelt 3 is thus elevated to a level above the floor surface.

In the lower position, which is shown in the left half of FIG. 3, the carrier 17 is in the deflated position, due to the fact that the hollow interior of the carrier is evacuated and consequently its volume has been reduced to substantially zero. In this lower position the rollers 2' are positioned just below the cover plate 15a, while the friction belt is laying on the cover plate 15a in a position just under the level of the floor 1 and just free from engagement with the rollers 2'.

Preferably the frame and the carrier are divided into independent longitudinal sections, as is known per se with roller tracks. These longitudinal sections may then be independently supplied by pressurized fluid, so that they may be independently adjusted in height, together with the section of the friction belt sections carried by them.

Figure 4:
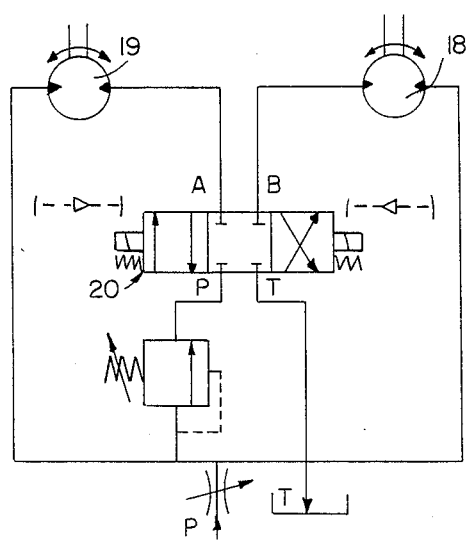
FIG. 4 shows the hydraulic diagram of the drive of the friction belt.
Figure 2A:
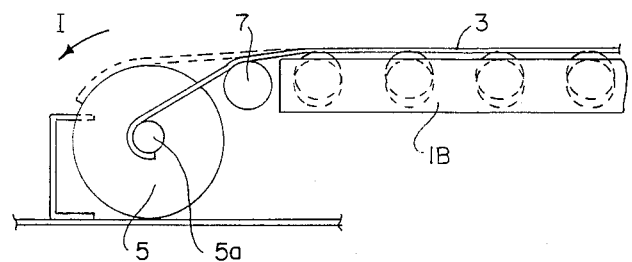
FIGS. 2a–2d are longitudinal cross-sectional views according to line II—II in FIG. 1.
Figure 2B:
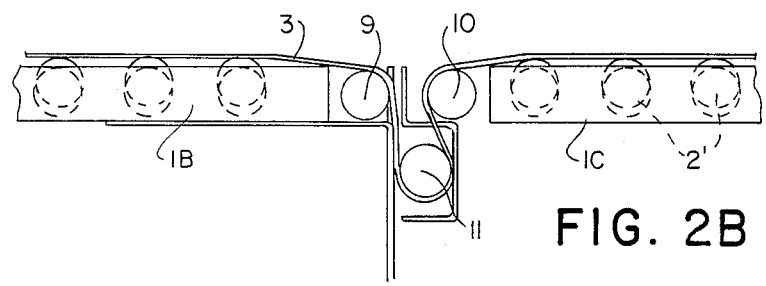
Figure 2C:
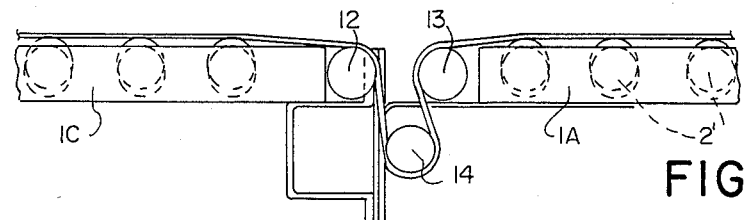
Figure 2D:
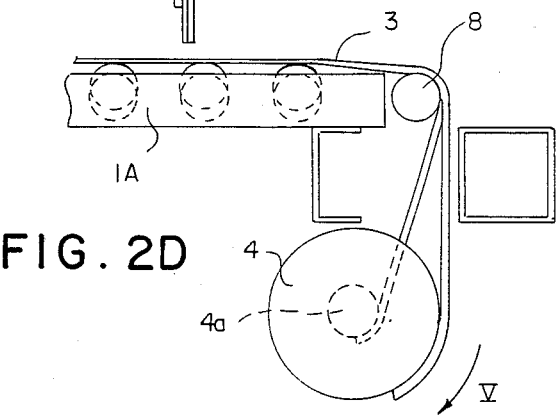

At the front and rear end of the floor 1 the friction belt 3 leads via guiding rollers 7 and 8 to drums 5 and 4 (FIGS. 2a and 2d). The shafts 4a and 5a of the drums 4 and 5 respectively are coupled to drive motors, which have not been shown in FIG. 1 but have been represented in FIG. 4 as hydromotors 18 and 19.

In the transition zone between the floor sections 1B and 1C and also in that between the floor sections 1C and 1A the friction belt 3 is guided by three additional rollers 9, 10, 11 and 12, 13, 14 respectively. The axis of the roller 9 has a fixed position relative to the front floor section 1B, whereas the axes of the rollers 13 and 14 take a fixed position relative to the rear floor section 1A. The rollers 10, 11 and 12 are carried by the intermediary floor sections 1C and consequently follow the latter in its upward and downward movements relative to the two other, fixed floor sections. It will be understood that with such a guide roller system the total friction belt length between the drums 4 and 5 will not vary when the floor section 1C is moving up and down.

In FIGS. 2a-2d the full line portions 3' indicate the situation, in which the free friction belt length required for fulfilling the transporting function is completely wound on the (rear) drum 4, while the front drum 5 is (practically) "empty".

From this situation the process of loading can take place. For this purpose the friction belt 3 and the roller tracks 2 are put into the active transporting position by supplying pressurized fluid to the carrier (sections) 17. The friction belt will thus be pressed against the lower side of a load, e.g. a container, placed on the rear portion of the floor.

Thereupon the control valve 20 (vide the diagram of FIG. 4) is moved, e.g. with the intermediary of an electrical signal, from the neutral position shown in the drawing to the right (the loading position). This causes the pressure line P to be connected to hydromotor 19 so that the latter starts rotating in a direction corresponding to the winding direction I (FIG. 2) of drum 5, whereas hydromotor 18 is connected to return line T and as a consequence of this will be taken along against the winding direction II of drum 4.

The counter pressure exerted by the motor 18 (which counter pressure may be adjustable, if desired) will keep the friction belt taut.

As soon as a load or the complete load had reached its final destination on the floor, the roller tracks and the friction belt or sections of the same may lowered into their inactive positions to allow the load to get into frictional engagement with the proper floor. Upon completion of the loading process the major portion of the free frictional belt length will have been wound onto the front drum 5. From that position onwards the unloading may take place, for which purpose the roller tracks 2 and the friction belt 5 are moved into their active positions again, while the valve in FIG. 4 has to be moved to the left (into the unloading position).

During the loading as well as during the unloading procedure use may be made of the lift platform section 1C of the floor in a manner as disclosed in U.S. application Ser. No. 033,016.

It will be understood, that the well-known height adjusting system for the roller tracks 2 and the friction belt 3 may be simply connected to the hydraulic drive system for the belt 3, such that the required safety is obtained.

The invention is not limited to the example shown in the drawing. Within the scope of the invention alternative systems for the height-adjustment of the roller tracks 2 and/or the friction belt 3 may be used.

I claim:

1. A load carrying floor of a load transporting vehicle, comprising at least two sections both provided with a number of roller tracks disposed parallel to one another for receiving a load which may be displaced across the floor with low frictional resistance, the rollers of said tracks being vertically adjustably mounted between an inactive position, in which said rollers are fully retracted below an upper floor surface, and an active position, in which said rollers partially upwardly project from the upper floor surface, displacement and holding means including at least one additional track of rollers, over which a friction belt is trained, which is adapted to come into frictional contact with a lower side of a load and to be selectively driven in two opposite directions so as to selectively displace the load in either of two directions and parallel to the roller tracks, said belt having ends which are fastened for winding or unwinding, respectively, on two drums each provided at a respective end of the floor, said additional track of rollers being movably supported in a frame and provided with means for lowering and lifting said rollers of said additional track along with said friction belt thereon between a first position below said upper floor surface and a second position above said upper floor surface.

2. Load carrying floor according to claim 1, wherein the rollers of said tracks are positioned in groups.

3. Load carrying floor according to claim 1, wherein said additional track is disposed between two said roller tracks and in parallel therewith.

4. Load carrying floor according to claim 3, further comprising hydraulic motors, said drums being connected to said hydraulic motors, which are hydraulically connected such that they may be selectively driven in a winding direction of the respective drum.

5. A load carrying floor according to claim 1, wherein said frame is supported on at least one oblong flexible tube member, which is adapted to be inflated from a position corresponding to the inactive roller track position to a position corresponding to the active roller track position.

* * * * *